June 1, 1926.  
F. A. WHITTEN  
POWER TAKE-OFF DEVICE FOR MOTOR VEHICLES  
Filed Nov. 18, 1919  
1,587,205
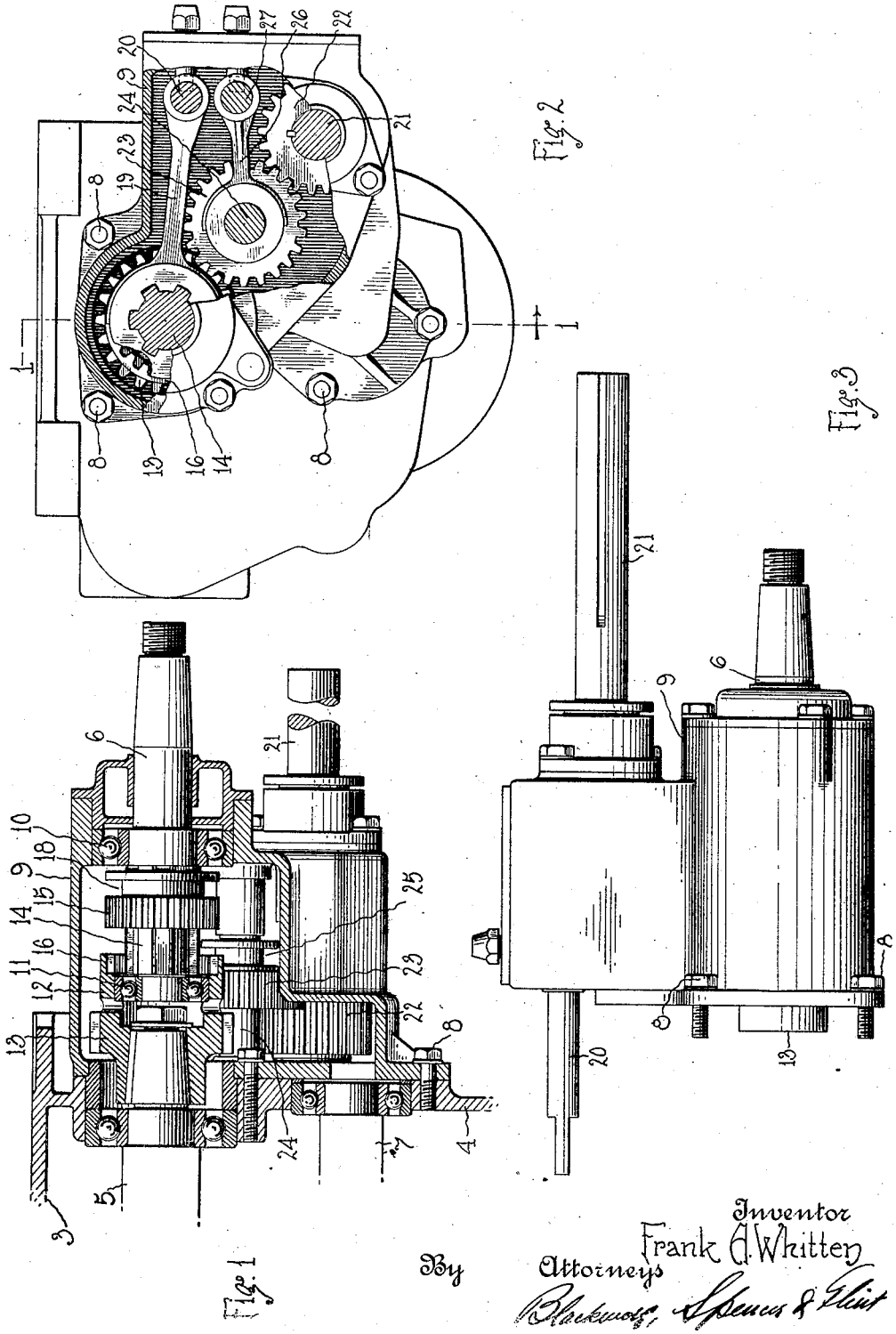
Inventor  
Frank A. Whitten  
By Attorneys  
Blackmore, Spencer & Flint Patented June 1, 1926.

1,587,205

UNITED STATES PATENT OFFICE.

FRANK A. WHITTEN, OF DETROIT, MICHIGAN, ASSIGNOR TO GENERAL MOTORS CORPORATION, OF DETROIT, MICHIGAN, A CORPORATION OF DELAWARE.

POWER TAKE-OFF DEVICE FOR MOTOR VEHICLES.

Application filed November 18, 1919. Serial No. 338,856.

My invention relates to automobiles, motor trucks, and similar self-propelled vehicles, and particularly to the transmission mechanism of such vehicles and through which power is communicated from the driving engine of the vehicle to the rear driving axle thereof, to thereby drive the vehicle.

The object of my invention is to provide an improved power take-off device associated with the transmission mechanism of the vehicle and by the use of which a dumping body of the vehicle may be elevated to dump the same by power derived from the engine whereby the vehicle is operated, a winch, winding drum, or other device may be operated from the engine, or which power take-off device may be employed for other purposes and in other services wherein it is desirable to be able to operate some element or device other than the rear driving axle of the vehicle from the engine and through the transmission mechanism and power shaft of the power plant of the vehicle.

My invention is illustrated in its preferred form in the drawing accompanying and forming a part of this specification; altho it will be appreciated that the drawing is for illustrative purposes only, and that my improved power take-off may be variously modified without, however, departing from the spirit of my invention as expressed in the claims at the end of this specification.

In the drawing:

Figure 1 is a view showing a section of my improved power take-off device attached to the change speed transmission gearing casing of the vehicle, the view being a section upon a vertical plane extending longitudinally of the device and the position of which is indicated approximately by the line 1—1, Figure 2.

Figure 2 is a view showing my invention as seen from a position to the rear thereof, the view being an end elevation and a portion of the housing within which the operative parts thereof are enclosed being broken away to show features of interior construction.

Figure 3 is a view showing my invention in plan, and as detached from the end wall of the transmission gearing casing whereby it is supported when in use.

Referring now to the drawing, the reference numeral 3 designates the external casing of an ordinary or common form of change speed gear mechanism and within which casing the various gears whereby operation of the vehicle at various speeds is secured are located, said gear casing having an end wall 4 within which the rear ends of a driving shaft section 5 and a counter-shaft 7 are rotatably supported as is usual in change speed gear devices. I wish, however, to state at this point that my invention is in no way concerned with the particular form of change speed gearing with which it is used, and that the same may be used in connection with various and in fact with any type of change speed gearing.

Associated with the transmission gear casing 3 and commonly secured directly to the end wall thereof as by means of cap screws 8 is a housing 9 within which the mechanism of my improved power take-off device is located, and through which housing the driving shaft made up of two sections 5, 6 extends, said driving shaft being made up of two sections which may be operatively connected with and disconnected from one another by means of suitable clutch mechanism located, preferably, within the housing 9. Said driving shaft is provided with a bearing 10 in the wall of the housing 9 in order to steady the section 6 thereof immediately to the rear of and in alignment with the section 5 of the shaft which is located within and extends from the transmission gear casing; and the left-hand end of the rear section 6 of said shaft is supported in a bearing 11 located in an extension 12 of a pinion 13 which is secured to the right-hand end of the left-hand section 5 of the driving shaft, as clearly shown in Figure 1, thereby providing a strong and rigid construction whereby the abutting ends of the two sections of the driving shaft are held in proper position in relation to one another.

The inner end of the section 6 of the driving shaft is splined as indicated at 14; and the reference numeral 15 designates a toothed clutch member slidable along said shaft section to thereby cause the teeth at the periphery thereof to move into engagement with the internal teeth 16 provided in a recess in the extremity of the projection 12 of the pinion 13, which is carried by the section 5 of the driving shaft, from which it follows that when the clutch member 15 is moved to the left the teeth upon its periphery will be moved into interlocking engagement with the interior teeth 16 to thereby couple the two shaft sections together and cause them to form in effect a single driving shaft extending from the transmission gear casing toward the driving axle of the vehicle, and through which motion may be communicated to said axle.

The hub of the clutch member 15 is provided with an annular groove 18 into which the arms of a bifurcated yoke member 19 extend, said member being itself carried by a rod 20 slidable in bearings provided in the housing 9 and which rod is commonly operated by means of a lever located adjacent the driver's seat of the vehicle through any suitable transmission rod or equivalent device.

The reference numeral 21 designates a power shaft carried by the housing 9 and rotatable in bearings carried by said housing, or carried one by said housing and the other by the end wall 4 of the gear casing 3, and from which power shaft motion may be communicated to any suitable hoisting or other power operated mechanism as hereinbefore explained to thereby operate the same; said mechanisms being used, for example, in connection with dumping bodies for vehicles in order to elevate the same and accomplish the dumping of the contents thereof. This power shaft extends substantially parallel with the driving shaft in the embodiment of my invention illustrated; and suitable gearing is provided within the housing 9 for communicating motion from the pinion 13 upon the driving shaft to the said power shaft.

In the form of my invention illustrated the gearing through which the power shaft 21 is driven from the driving shaft comprises a gear 22 secured to and rotating with the said power shaft, together with an idler gear 23 slidable along a shaft 24 suitably supported within the housing 9; the hub of the idler gear having an annular groove 25 into which the arms of a second bifurcated yoke 26 enter and which yoke is itself shifted longitudinally by means of a rod 27 slidable in bearings provided in the wall of the housing 9, and which rod may be operated from the seat of the vehicle through any suitable mechanism. The idler pinion 23 is preferably in constant mesh with the gear 22 which is made considerably wider than the pinion 13; and said gear upon being moved to the left, Figure 1, may be brought into mesh with the pinion 13 on the driving shaft, whereupon motion will be transmitted through the pinion 13, the idler gear 23, and the gear 22 to the power take-off shaft 21, and to whatever mechanism or device may be operated thereby.

It will be appreciated that the power take-off shaft 21 may be driven at any of the speeds at which the section 5 of the driving shaft is or may be driven from the engine through the change speed transmission gearing within the casing 3, so that a comparatively wide range of speed is secured in the said power take-off shaft. It will be further appreciated that when the clutch member 15 is in the position in which it is shown in Figure 1, and the idler gear 23 is in mesh with the pinion 13, the power shaft 21 only will be driven; the driving connection to the rear axle of the vehicle being interrupted by the clutch mechanism between the two sections of the driving shaft. If, however, the clutch member 15 is moved to the left and into engagement with the teeth 16, the idler gear 23 being maintained in mesh with the pinion 13, then the vehicle will be driven in a forward direction at the same time that the power take-off shaft is driven, thus enabling the contents of a dumping body to be discharged at the same time that the vehicle is being driven forward.

It will be appreciated finally that in the normal operation of the vehicle the clutch 15 is in engagement with the teeth 16 to thereby maintain a driving action between the two sections of the driving shaft so that motion may be transmitted to the driving axle of the vehicle, the idler gear 23 being normally in its right-hand position so that motion will not be communicated to the power take-off shaft except at such times as it is desired to operate the same, while mechanisms or devices of various kinds and for a variety of purposes may be operated from the power plant of the vehicle by interrupting the driving action of the clutch, and moving the said idler gear to the left and into mesh with the pinion 13.

Having thus described and explained my invention, I claim and desire to secure by Letters Patent:

1. In a power take-off device of the class described and in combination with a transmission gear casing having an end wall, and a driving shaft extending from said casing and through which the driving axle of a motor driven vehicle may be driven; a housing secured to the end wall of said casing and through which said driving shaft extends; a rotatable power shaft supported in bearings carried by said housing and extending substantially parallel with said driving shaft; a pinion carried by and rotatable with said driving shaft; a gear carried by and rotating with said power shaft; an idler gear located within said housing and movable into and out of mesh with said pinion and gear; and means for moving said idler gear into and out of mesh with the pinion and gear aforesaid, to thereby operatively connect said driving shaft with and to disconnect the same from said power shaft.

2. In a power take-off device of the class described and in combination with a transmission gearing casing having an end wall; a housing secured to said end wall; a driving shaft extending from said casing through said housing and through which the driving axle of a motor vehicle may be driven, and which driving shaft comprises two sections arranged in alignment with one another; clutch mechanism located within said housing and whereby said driving shaft sections may be connected with and disconnected from one another; a power shaft rotatable in bearings carried by said housing and extending substantially parallel with said driving shaft; a pinion carried by and rotating with said driving shaft; a gear carried by and rotating with said power shaft; an idler gear located within said housing and movable into mesh with said pinion and gear to thereby operatively connect said driving and power shafts with one another; and means for moving said idler gear in a direction parallel with its axis of rotation.

In testimony whereof I affix my signature.

FRANK A. WHITTEN.